(12) United States Patent
Maue et al.

(10) Patent No.: US 6,700,310 B2
(45) Date of Patent: Mar. 2, 2004

(54) SELF-POWERED WIRELESS SWITCH

(75) Inventors: H. Winston Maue, Farmington Hills, MI (US); Richard Meinzer, Glastonbury, CT (US); Joe Paradiso, Medford, MA (US); Mark Feldmeier, Waukesha, WI (US)

(73) Assignees: Lear Corporation, Southfield, MI (US); Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/949,150

(22) Filed: Sep. 7, 2001

(65) Prior Publication Data

US 2002/0074898 A1 Jun. 20, 2002

(51) Int. Cl.$^7$ .............................................. H01L 41/08
(52) U.S. Cl. ...................................... 310/339; 310/319
(58) Field of Search .................................. 310/319, 338, 310/339

(56) References Cited

U.S. PATENT DOCUMENTS

| 2,976,426 A | | 3/1961 | Rappaport |
| 3,056,932 A | * | 10/1962 | Wood ......................... 310/339 |

(List continued on next page.)

FOREIGN PATENT DOCUMENTS

| DE | 196 20 880 A1 | 11/1997 |
| DE | 197 55 620 A1 | 6/1999 |
| DE | 199 55 722 A1 | 5/2001 |
| EP | 0 656 612 A | 6/1995 |
| EP | 0 680 854 A2 | 11/1995 |
| EP | 0 867 826 A2 | 9/1998 |
| FR | 2 802 731 A | 6/2001 |
| WO | WO 97/39604 | 10/1997 |
| WO | WO 01/91315 A2 | 11/2001 |

OTHER PUBLICATIONS

P. Webb and M. Suggitt, "Gadgets and Necessities—An Encyclopedia of Household Innovations," ABC–CLIO, Santa Barbara, CA, 2000, pp. 237–238.

John Kymissis et al., "Parasitic Power Harvesting in Shoes," *Presented at the Second IEEE International Conference on Wearable Computing*, IEEE Computer Society Press, pp. 132–139, Oct., 1998.

N. Shenck, J. Paradiso, "Energy Scavenging With Shoe–Mounted Piezoelectrics," *IEEE Micro*, vol. 21, No. 3, May–Jun. 2001, pp. 30–42.

J.F. Antaki et al., "A Gait Powered Autologous Battery Changing System for Artificial Organs," *Proc. of the 1995 American Society of Artificial Internal Organs Conf.*, Lippincott Williams & Wilkins, Philadelphia, 1995, pp. M588–M595.

J. Paradiso, "Electronic Music: New Ways to Play," *IEEE Spectrum*, The Institute of Electrical and Electronics Engineers, Inc., Dec. 1997, pp. 18–30.

New Glow–in–the–Dark Plastic Technology, WARD's Auto World, May 1998, p. 164.

D. B. Roitman, H. Antoniadis, J. Sheats, and F. Pourmirzaie, Polymers Fulfill Promise For Electroluminescence, Optoelectronics World, Jul. 1998, pp. 163–166.

*Primary Examiner*—Mark Budd
(74) *Attorney, Agent, or Firm*—Bill C. Panagos

(57) ABSTRACT

A wireless switch is provided having a twenty-year life energy harvesting arrangement for self-powering a wireless transmitter. The energy harvesting arrangement is implemented in one embodiment using a piezoelectric switch element. A tritium light source and photovoltaic device are used in a second embodiment, while a black light source and photovoltaic device are used in a third embodiment. The energy harvesting wireless switch arrangement of the present invention can be combined, for example, with a vehicle side mirror switch, to reduce the complexity of the wire harness feeding the door. The wireless switch can be located without regard to accessability of a wiring harness or connector.

1 Claim, 2 Drawing Sheets

U.S. PATENT DOCUMENTS

| | | | |
|---|---|---|---|
| 3,270,283 A | * | 8/1966 | Ikrath et al. ............... 310/339 |
| 3,548,314 A | | 12/1970 | Mitchell |
| 3,796,958 A | | 3/1974 | Johnston et al. |
| 3,940,637 A | | 2/1976 | Ohigashi et al. |
| 3,976,899 A | | 8/1976 | Fanshawe |
| 3,980,996 A | | 9/1976 | Greenspan et al. |
| 4,295,058 A | | 10/1981 | Lade et al. |
| 4,402,524 A | * | 9/1983 | D'Antonio ............... 280/612 |
| 4,577,052 A | | 3/1986 | Schutten et al. |
| 4,612,472 A | * | 9/1986 | Kakizaki et al. ............ 310/339 |
| 4,623,814 A | * | 11/1986 | Kondo et al. ............... 310/339 |
| 4,631,736 A | | 12/1986 | Yamanoue et al. |
| 4,761,582 A | | 8/1988 | McKee |
| 4,811,013 A | | 3/1989 | Akutsu |
| 4,835,533 A | | 5/1989 | Akutsu |
| 4,864,340 A | | 9/1989 | Kaneko |
| 4,866,433 A | | 9/1989 | Akutsu |
| 4,983,963 A | | 1/1991 | Hodgetts et al. |
| 5,014,062 A | | 5/1991 | Schriner et al. |
| 5,065,067 A | * | 11/1991 | Todd et al. ............... 310/339 |
| 5,079,530 A | | 1/1992 | Tsuchiyama |
| 5,082,505 A | | 1/1992 | Cota et al. |
| 5,124,610 A | | 6/1992 | Conley et al. |
| 5,216,316 A | | 6/1993 | Ipcinski |
| 5,235,232 A | | 8/1993 | Conley et al. |
| 5,239,779 A | | 8/1993 | DeLand et al. |
| 5,256,878 A | | 10/1993 | LeVert |
| 5,266,863 A | | 11/1993 | Nonami et al. |
| 5,280,751 A | | 1/1994 | Muirhead et al. |
| 5,306,445 A | | 4/1994 | Reed et al. |
| 5,315,204 A | | 5/1994 | Park |
| 5,443,657 A | | 8/1995 | Rivenburg et al. |
| 5,486,818 A | | 1/1996 | Loponen |
| 5,552,972 A | | 9/1996 | Rezvani |
| 5,568,939 A | | 10/1996 | Blackburn et al. |
| 5,571,253 A | | 11/1996 | Blackburn et al. |
| 5,592,169 A | | 1/1997 | Nakamura et al. |
| 5,606,213 A | | 2/1997 | Kherani et al. |
| 5,632,169 A | | 5/1997 | Clark et al. |
| 5,642,014 A | | 6/1997 | Hillenius |
| 5,684,470 A | | 11/1997 | DeLand et al. |
| 5,721,462 A | | 2/1998 | Shanks |
| 5,765,680 A | | 6/1998 | Tam |
| 5,801,475 A | * | 9/1998 | Kimura ............... 310/319 |
| 5,859,484 A | | 1/1999 | Mannik et al. |
| 5,870,914 A | | 2/1999 | Dawson |
| 5,892,430 A | | 4/1999 | Wiesman et al. |
| 5,911,529 A | | 6/1999 | Crisan |
| 5,942,985 A | | 8/1999 | Chin |
| 5,946,343 A | | 8/1999 | Schotz et al. |
| 5,977,882 A | | 11/1999 | Moore |
| 6,001,211 A | | 12/1999 | Hiroyuki |
| 6,025,783 A | | 2/2000 | Steffens, Jr. |
| 6,031,465 A | | 2/2000 | Burgess |
| 6,034,617 A | | 3/2000 | Luebke et al. |
| 6,038,895 A | | 3/2000 | Menke et al. |
| 6,072,403 A | | 6/2000 | Iwasaki et al. |
| 6,084,317 A | | 7/2000 | Wolfe et al. |
| 6,089,649 A | | 7/2000 | Hamada et al. |
| 6,094,131 A | | 7/2000 | Chen et al. |
| 6,144,288 A | | 11/2000 | Jahn et al. |
| 6,147,420 A | | 11/2000 | Roser |
| 6,407,483 B1 | * | 6/2002 | Nunuparov et al. ....... 310/339 |
| 2002/0084717 A1 | | 7/2002 | Murphy |

* cited by examiner

SELF-POWERED WIRELESS SWITCH

TECHNICAL FIELD

The present invention generally relates to wireless switches, and more particularly to a wireless switch such as for use in an automobile or aircraft environment which does require a separate source of electrical power and associated wiring.

BACKGROUND ART

During the last decade, the automotive industry has experienced very significant growth in the electrical/electronic content of automobiles. The future growth rate of this content is predicted to become exponential. One cause for this significant growth is the availability of new vehicle systems such as cabin communication systems (CCS), active noise control systems, automobile personal computers, and on-board navigational systems. When any of these systems is added to a vehicle, interconnection is made using extensions of the vehicle's conventional wiring/electrical distribution system technology. This conventional technology is characterized by very complex arrays of wire harnesses, interconnecting switches, motors, relays, electronic modules and the like. The proliferation in the quantity of the components required to implement new features is becoming difficult to manage from cost, serviceability and packaging viewpoints.

For the past thirty years, multiplexing has been extolled as a technology capable of addressing these issues. However, to date, no major automotive program has received large benefits from this technology. Significant reasons include the continued need for complex wire harness arrays to interconnect switches and sensors with multiplexed electronic modules and multiple power distribution feeds.

As shown in FIG. 1, conventional automotive control and electrical power distribution systems share a common architecture. Low power input signals from remotely located switches 10 are transmitted through wires 12 to a controller 14. Controller 14 typically includes a control algorithm for selectively distributing power to activate remotely located external loads 16 via additional wires 18. The necessity of supplying power from a vehicle battery 20 to each of the switches, controller, and loads generally results in a very complex electrical distribution system. As the number of systems on a vehicle increase, the complexity of the distribution as well as the bulk of associated wiring harnesses increases.

As a result, wireless communication between switches and controllers has been proposed as a way of reducing the number of wires. However, the need to supply electrical power still requires the use of a wiring harness, thereby negating much of the advantage gained by using a wireless communication system. In other words, a maximum reduction in the number of wires to zero will not be achieved, while full freedom to locate a switch anywhere in the vehicle will not be attained.

The use of a dedicated battery to provide power locally at individual switches can eliminate the need for power supply wires, but conventional batteries have a limited life. Thus, continual battery replacement becomes a major drawback, particularly in vehicle applications where a large number of switches are used. Thus, for applications such as automobiles and aircraft, a power source with at least a twenty-year life expectancy is required. As a consequence, a need exists for a wireless switch arrangement that does not require any external power distribution wiring while also being capable of attaining the desired twenty-year life expectancy.

DISCLOSURE OF INVENTION

It is therefore an object of the present invention to provide a wireless switch arrangement that generates its own electrical power to remove any need for a direct connection to a battery or other external source of electrical power.

It is another object of the present invention to provide a wireless switch having a local energy harvesting arrangement dedicated to the switch circuit to remove any need for an external power supply wire connection to the switch.

It is yet object of the present invention to provide a wireless switch having at least a twenty-year power source.

In accordance with these and other objects, the present invention provides a twenty-year life, self-powered wireless switch for automobiles, aircraft (e.g., jet engines), elevators, and other applications requiring transmission of control signals/information from an inaccessible or rotating location. The self-powered wireless switch is provided with a wireless transmitter, and an energy harvesting device arranged to produce electrical power for operation of the wireless transmitter when actuated by a switch. In accordance with aspect of the present invention, the energy harvesting device includes a piezoelectric element arranged to be distressed upon actuation of the switch. In accordance with another aspect, the energy harvesting device can include a tritium lamp arranged to energize a phosphor coating to produce light upon actuation of the switch, and at least one photo detector arranged to receive the light and generate the electrical power. In accordance with still another aspect of the present invention, the energy harvesting device includes at least one photo detector arranged to receive the light from a lamp. Preferably, the lamp can be arranged to generate black light.

Thus, the present invention provides a switch arrangement that can be located without regard to insuring accessability of a wiring harness or connector. This freedom to locate a switch anywhere without being confined by a wire harness reduces the complexity of the power distribution system in such applications as automobiles, aircraft and HVAC equipment.

Embodiments of the present invention comprehend a self-powered wireless switch comprising a wireless transmitter, an energy harvesting device, and an electric circuit. The energy harvesting device is arranged to produce electrical power for operation of the wireless transmitter upon actuation of a switch by a user. The energy harvesting device includes a piezoelectric element arranged to be distressed upon actuation of the switch. The electric circuit includes a matching wound step down transformer coupling the piezoelectric element to a rectifier connected to a capacitor. The electric circuit allows the piezoelectric element to resonate and the capacitor to receive the harvested energy and supply electrical power for operation of the wireless transmitter.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
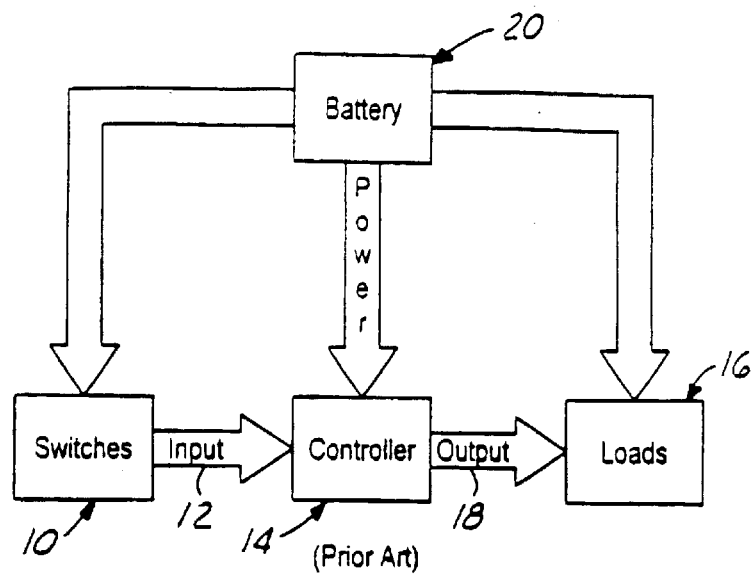
FIG. 1 is a block circuit diagram of a conventional wired electrical power distribution system for a switch and controller arrangement.
Figure 2:
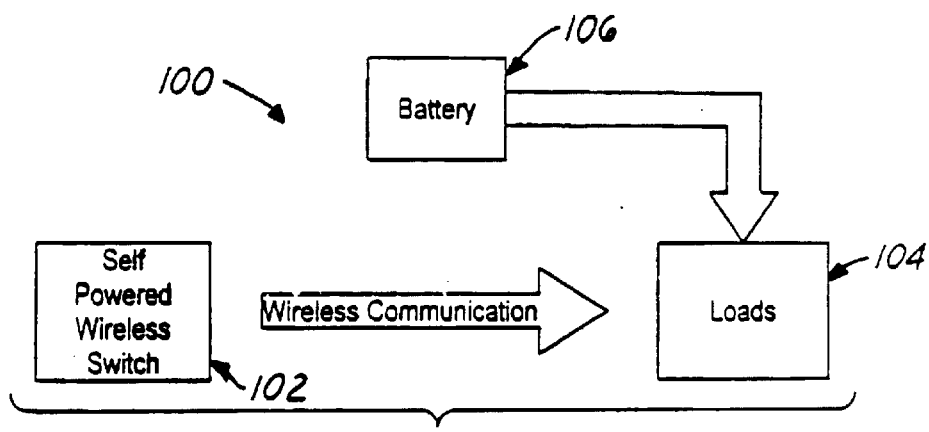
FIG. 2 is a block circuit diagram of a self-powered wireless switch in accordance with the present invention.

FIG. 2 illustrates a wireless switch arrangement 100 in accordance with the present invention. As described in more detail below, a wireless switch 102 is arranged to be self-powering, thereby limiting the use of a wiring harness to connecting a controlled load(s) 104 to a source of electrical power such as a battery 106. In other words, the present invention is able to eliminate the connection of any wiring to a user operated control switch. Thus, in accordance with the present invention, the wireless switch is arranged to perform (1) actuation; (2) communication; (3) backlighting (i.e., switch illumination); and (4) energy harvesting. The term "self-powered" or "energy harvesting" is used in this description to define a switch assembly that does not need servicing for twenty years and does not require a direct wire connection to a vehicle's normal power distribution system.

Figure 3:
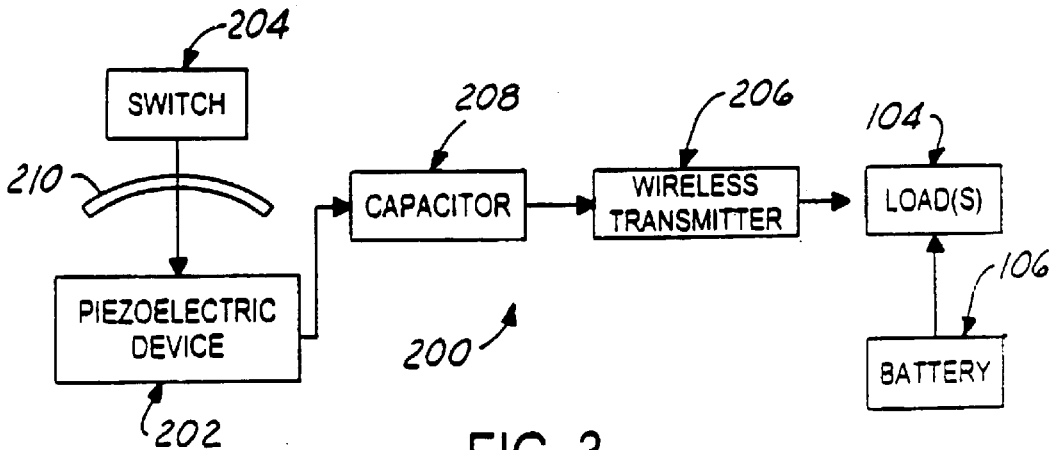
FIG. 3 is a block circuit diagram of a first embodiment of a self-powered wireless switch using a piezoelectric switch arrangement.

Referring now to FIG. 3, a self-powered wireless switch arrangement 200 is shown in accordance with a first embodiment of the present invention. More specifically, a piezoelectric switch element 202 is arranged to be actuated by a user via a switch handle or button 204. The switch handle operates to apply a mechanical force to deflect or distress the piezoelectric element, which in turn includes a piezoelectric material (for example, PZT—lead zirconate titanate) that operates to convert the mechanical force into an output electric voltage and current. The generated electric power can be directly connected to a wireless transmitter circuit 206, or stored by a capacitor 208. The capacitor would then become the power source for operation of wireless transmitter circuit 206.

The wireless transmitter circuit can be implemented using RF, infrared, ultrasonic and other wireless technologies known to one of ordinary skill in the art. For example, a 13.6 MHz transmitter circuit can be provided that only requires approximately 1 milliwatt to power the transmitter. However, the output of the transmitter is not encrypted. Another possible transmitter is a TIRIS ("Texas Instrument Registration and Identification System") transponder, manufactured by Texas Instruments (TI). This device includes an interrogator that is powered by the energy generated or harvested, and is arranged to generate radiation that is stored for a period of 50 ms. Subsequently, the transponder radiates information at 134 KHz for 50 ms while the TIRIS interrogator stops transmitting radiation and goes into a 50 ms read mode. The TIRIS device can transmit 64 bits of information during each 50 ms burst. This information content allows for use of sufficient coding to distinguish one switch location from another. In addition, because the TIRIS device uses a higher frequency output, less energy is needed to actually send the signal. Thus, the TIRIS device consumes less power than a lower frequency transmitter. Furthermore, the TIRIS transponder is rugged and small, and therefore practical for use in hostile environments such as typically encountered in vehicle applications.

A Belleville washer 210 may be used to distress or activate the PZT material in the example. The Belleville washer is arranged to have a negative load-deflection curve so that the Belleville contacts the PZT material with the same force every time the Belleville is pushed beyond a certain critical point or switch threshold. This insures a reliable source of power for the transmitter once the switch threshold is overcome. The higher the height of the Belleville, the greater the magnitude of the negative deflection and corresponding distress applied to the PZT material. Using a negative mechanical motion allows the activation process to be independent of the force applied to the Belleville. For a large Belleville, thinning part of the Belleville will increase the size of the spot needed to be pushed to obtain the maximum negative deflection of the PZT material.

To further lower manufacturing costs, a preferred embodiment of the present invention utilizes MEMS technology to integrate the switch components onto a single chip. More specifically, MEMS (Micro ElectroMechanical Silicon) is an emerging technology in which mechanical structures and electronic circuits are formed on silicon wafers. One example of a vehicle component that utilizes this approach is an air bag/collision detection sensor. MEMS can be used to form other electronic components such as switches, navigational compasses, relays, and RF transmitters. For example, this manufacturing concept will enable a wireless vehicle side mirror power switch assembly to be integrated on a single silicon chip. The switch would communicate wirelessly with the door mounted outside mirrors, and would have complete freedom of location on the door panel because no wiring harness would be required. The use of MEMS technology would reduce complexity, improve reliability and reduce cost while providing more packaging flexibility. The self-powered wireless switch of the present invention can be used in other areas of the vehicle, including doors, instrument panel and headliner. Multiple switches can be put on a single chip and coupled to one transmitter circuit. An analog indicator, processor or other arrangement can be included to provide individual coding of each switch.

Figure 4:
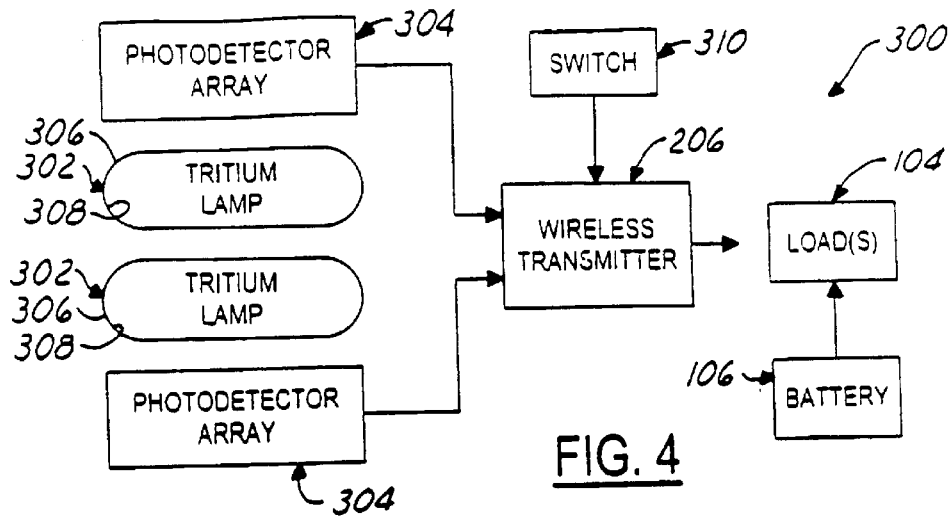
FIG. 4 is a block circuit diagram of a second embodiment of a self-powered wireless switch using a tritium lamp arrangement.

Referring now to FIG. 4, a second embodiment of a self-powered wireless switch 300 is shown in accordance with the present invention, where like elements to the previous embodiment have been denoted with the same reference number. In this embodiment, the energy harvesting arrangement uses at least one tritium lamp 302 and a photovoltaic device 304 to power the wireless transmitter circuit 206. The tritium lamp provides a lightweight, long life energy source. For example, these lamps are now being used to illuminate exit signs on airplanes and watch dials. Tritium has a half-life of 12.4 years and decays to helium by releasing a beta particle with a maximum energy of 18.6 keV. This energy is approximately equal to the energy of the electrons in a television tube. Thus, the products of tritium decay, i.e., stable helium and electrons, can be contained within a glass sphere 306. The released beta particles have sufficient energy to excite phosphors 308 that can be coated on the inside of the glass sphere containing the gas. Monochromatic light is thus produced to efficiently excite an array of photo detectors in the photovoltaic device. The light intensity is temperature independent since because it is produced through a nuclear process. Over the expected temperature range for car operation, the optical efficiency of the photo detectors is also relatively insensitive to temperature. Thus, the output power from the tritium power source will be relatively independent of temperature.

In operation, a user actuated switch 310 is connected to a control input of wireless transmitter 206. A voltage regulator (not shown) can be included to regulate the supply of power from the photo detectors.

The light generated by the tritium lamp(s) can also be used to illuminate (i.e., backlight) the switch. In addition, lighting effects can be obtained by using a plurality of phosphors. In order to attain a twenty-year operational life, a plurality of tritium lamps can be close coupled to the photovoltaic devices, thereby insuring that a sufficient amount light is generated beyond the 12.4 year half-life of the tritium. For example, a set of glass spheres each containing the tritium/phosphor can be sandwiched between a set of photo detector arrays. The output from these arrays provide the power necessary to operate the wireless transmitter.

Further, since these components are relatively small, they can be potted together to make a single element. In a vehicle door application, this element could be mounted behind or under a mirror controller so that controls for a side view mirror would be in direct contact with the wireless chip. In other applications such as jet engines and elevators, the wireless chip/tritium power supply can be separated from the user operated switch 310.

Figure 5:
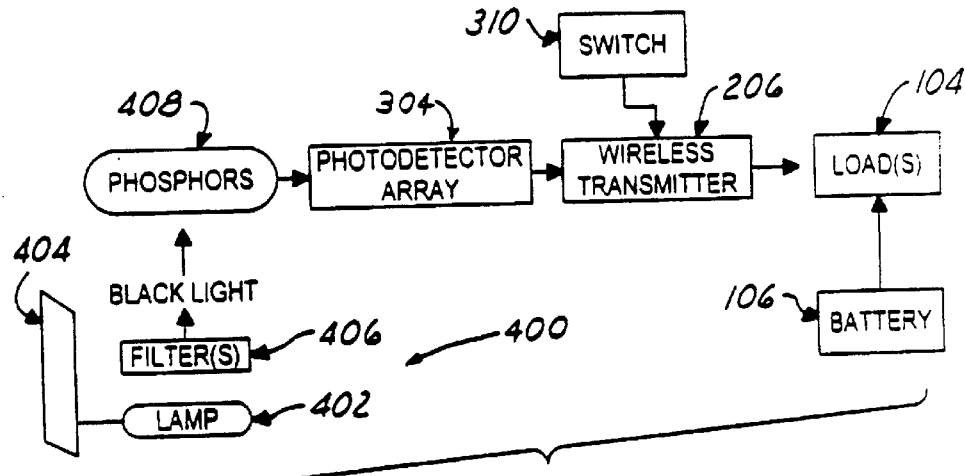
FIG. 5 is a block circuit diagram of an alternative arrangement for the second embodiment which uses a source of black light.

In an alternative embodiment 400 shown in FIG. 5, the basic tritium power source is replaced with a black light source. For example, in an automobile, the interior could be illuminated with black light via a bulb 402 located in a headliner 404. A conventional bulb produces black light (UV), and one or more filters 406 can be used to eliminate the visible portion of the optical spectrum. Thus, the black light is invisible to the driver, but can be used to excite phosphors 408 to illuminate switch 310 and simultaneously excite photo detectors 304. Visible light could also be used, but depending on the location, could be a distraction to a vehicle occupant, especially at night. For some applications, generating electrical power via black light or mechanical motion may be more attractive in terms of cost than using the tritium-based power source.

Thus, the self-powered wireless switch of the present invention allows a finger actuated switch to provide sufficient power to operate a wireless transmitter capable of communicating 64 bits of information. The energy harvesting or generating arrangement allows the switch to locally collect or generate energy to power the wireless circuitry as well as to potentially provide light or power for backlighting of the switch.

As noted above, one particular application of the self-powered wireless switch is controlling operation of a door mounted outside mirror. In such an application, motorized mirrors are powered via an H-bridge, which would be controlled via a set of wireless switches within the vehicle. Transmission would occur at the switch, while a receiver located near the H-bridge would receive the signal. A relay can be activated to allow electrical power to energize the mirror motor when a signal is received. In addition to door mounted control switches, the wireless switch of the present invention could be used to control a variety of systems in an automobile.

Figure 6:
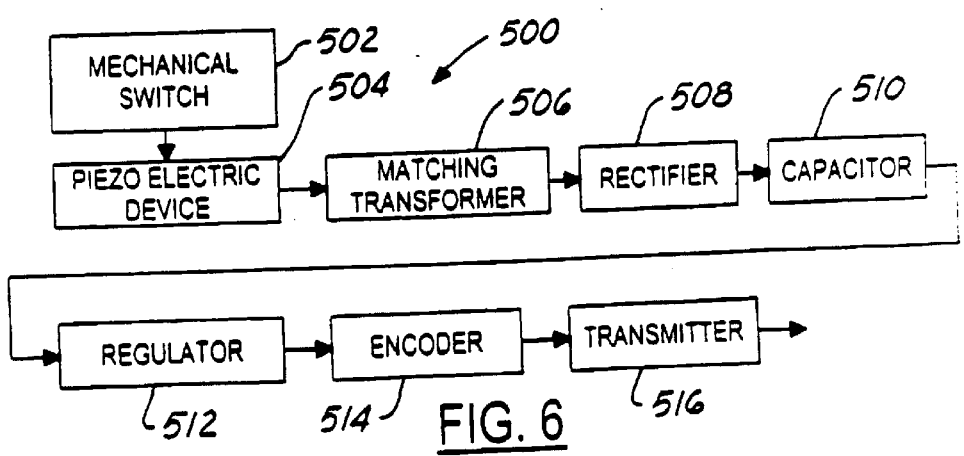
FIG. 6 is a block circuit diagram of a preferred implementation of the first embodiment of a self-powered wireless switch using a piezoelectric switch arrangment.

FIG. 6 illustrates a preferred implementation for the piezoelectric device embodiment of the self-powered wireless switch, generally, at 500. Mechanical switch 502 may be implemented in any suitable fashion such as a spring-loaded striker. Piezoelectric device 504 is connected to matching transformer 506. Matching transformer 506 is a wound step down transformer and it connects to rectifier 508. Preferably, the piezoelectric device 504 should vibrate near its mechanical resonance. The inductance as seen by piezoelectric device 504 looking into matching transformer 506 (thus including effective inductance from the secondary side of the transformer) is selected based on the capacitance of piezoelectric device 504 and the natural mechanical resonating frequency of piezoelectric device 504. Proper selection of transformer 506 results in a circuit that resonates after the initial impact of mechanical switch 502 with piezoelectric device 504. The resonate behavior of the electric circuit together with the step down transformer 506 improves the ability of capacitor 510 to receive and store a charge. That is, the user actuates mechanical switch 502, which impacts piezoelectric device 504 causing piezoelectric device 504 to mechanically resonate. Matching transformer 506 steps down the voltage from piezoelectric device 504 and charges capacitor 510 through rectifier 508. Matching transformer 506 is a wound transformer having an inductance selected such that piezoelectric device 504 resonates. Capacitor 510 produces a voltage that is regulated by regulator 512, and drives encoder 514 and transmitter 516.

In an exemplary implementation, a step down transformer is selected to allow the piezoelectric element to resonate. Specifically, the piezoelectric element is impacted for a very short duration and then released, allowing it to self-oscillate at its resonate frequency. Since piezoelectrics produce high voltages at low currents, a step down transformer is used. As mentioned above, the capacitance of the piezoelectric element and the inductance of the circuit form a resonate circuit having a resonate frequency equal to the piezoelectric element's mechanical resonate frequency. After passing through the transformer, electric energy is rectified and stored in capacitor 510. A suitable regulator is a MAX666 low-dropout linear regulator which provides a three volt supply. A suitable encoder is the HT12E digital ID encoder. Further in the example, a suitable transmitter is the RFM HX1003. Of course, it is appreciated that these components are exemplary and that the present invention may utilize a wide variety of alternative components as indicated by the architecture of FIG. 6.

Thus, while embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A self-powered wireless switch comprising:

a wireless transmitter;

an energy harvesting device arranged to produce electrical power for operation of the wireless transmitter upon actuation of a switch by a user, wherein the energy harvesting device includes a piezoelectric element arranged to be distressed upon actuation of the switch; and an electric circuit including a matching wound step down transformer coupling the piezoelectric element to a rectifier connected to a capacitor to allow the piezoelectric element to resonate and the capacitor to receive the harvested energy and supply electrical power for operation of the wireless transmitter wherein a capacitance of the piezoelectric element and an inductance of the electric circuit have a resonate frequency substantially equal to a mechanical resonate frequency of the piezoelectric element.

* * * * *